UNITED STATES PATENT OFFICE.

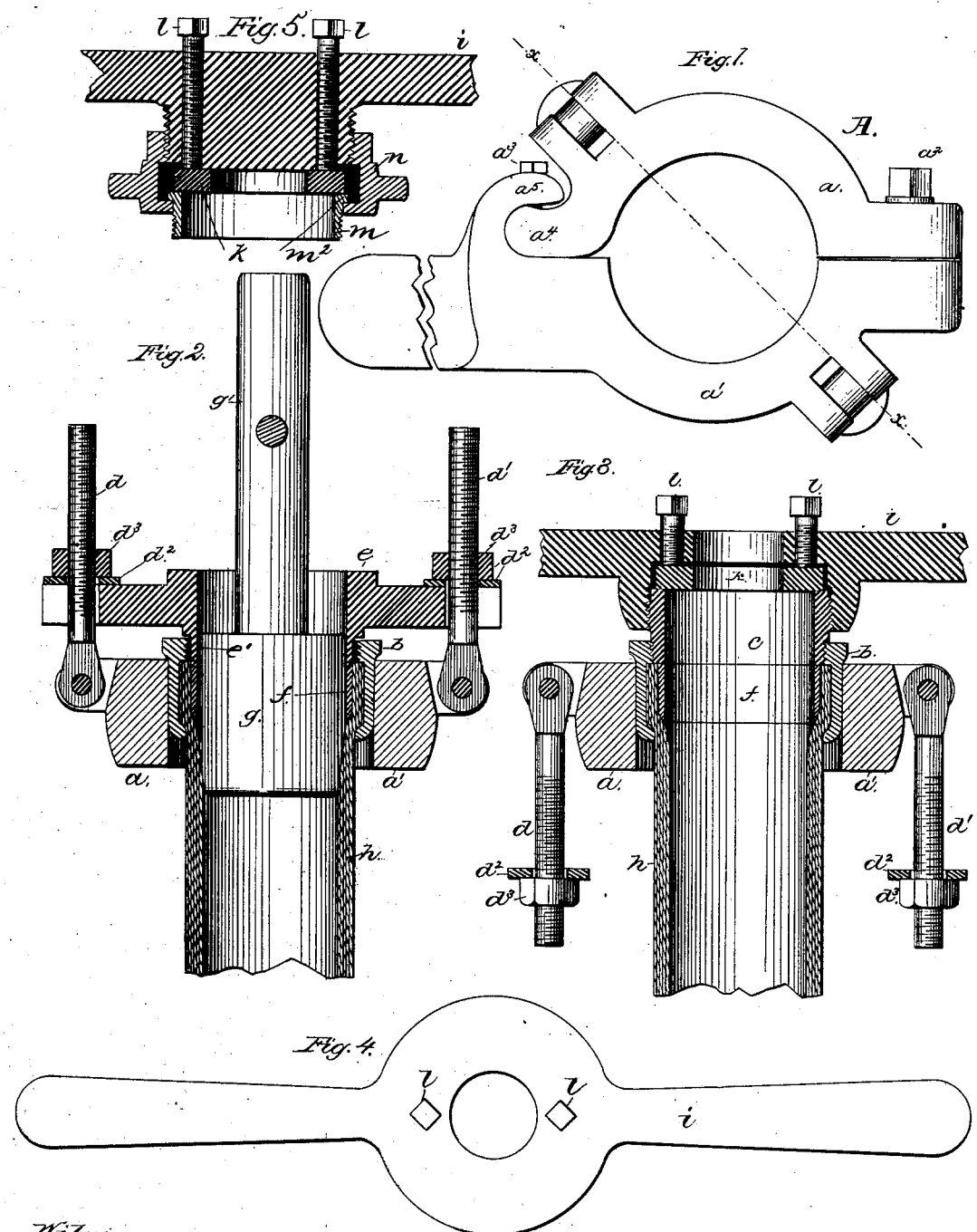

CORNELIUS CALLAHAN, OF CHELSEA, MASSACHUSETTS, ASSIGNOR TO THE AMERICAN FIRE HOSE COMPANY, OF SAME PLACE.

APPARATUS FOR APPLYING COUPLINGS TO HOSE.

SPECIFICATION forming part of Letters Patent No. 245,056, dated August 2, 1881.

Application filed May 11, 1881. (No model.)

*To all whom it may concern:*

Be it known that I, CORNELIUS CALLAHAN, of Chelsea, county of Suffolk, State of Massachusetts, have invented an Improvement in Apparatus for Applying Couplings to Hose, of which the following description, in connection with the accompanying drawings, is a specification.

This invention relates to an apparatus for applying couplings to hydraulic hose, such apparatus being very serviceable, not only for factory use where hose-couplings are first applied to hose, but also for use by firemen or others of a fire department, when it is desired to quickly apply a new coupling to a length of hose to repair damage, &c.

In this my invention I employ a clamp or vise to receive the outermost ring of the hose-coupling, and in this ring I place the end of the hose. This done, I insert into the outer ring of the coupling, and into the open end of the hose, a conical ring-director, about which I place the inner ring of the hose-coupling, forcing it downward a little between the director and the interior of the hose, when I apply about the director a yoke provided with suitable projections to bear upon the upper end of the interior ring of the coupling, and by means of suitable screws and nuts or equivalents I force the yoke gradually downward, so that its projections, resting upon the upper end of the interior ring of the coupling, force the ring down into its proper position within the interior of the hose. After this the yoke is removed and the working-screw or union, frictionally or otherwise suitably held in a working-screw or union-holder, is turned into the screw-threaded outer ring of the coupling, the lower end of the working-screw or union forming a water-tight joint with the upper end of the interior ring of the coupling.

Figure 1 represents, in top view, a clamp or vise of suitable form to receive and hold the outer coupling-ring while the coupling is being attached to the hose. Fig. 2 represents the clamp or vise for the coupling-ring and the yoke, with the projection to bear upon the inner ring of the coupling, and the outer and inner coupling-rings and hose in vertical section, the ring-director being shown in elevation, the section of the clamp being on the dotted line $xx$, Fig. 1. Fig. 3 represents the clamp or vise, the coupling-rings and hose in like section, and also in section with the working-screw, the frictional clamping device and the working-screw holder. Fig. 4 is a top view of the working-screw holder, and Fig. 5 is a like vertical section of a holder adapted to insert the union of the female part of the coupling, with the outer ring of the coupling, the said figure showing the union and also the running section of the female part of the coupling.

Referring to the drawings, A denotes the clamp or vise, composed of two parts, $a\ a'$, adjustably connected by means of a bolt, $a^2$, and by means of a screw, $a^3$, which engages the curved end $a^4$ of the part $a$ when placed underneath a hooked part, $a^5$, of the part $a'$. This clamp will preferably be made in the form shown, but may be made in any other form, it only being necessary that the clamp be so constructed as to securely engage and hold the outer ring, $b$, of the coupling in place, so that it will not rotate when the working-screw $c$, or union is being screwed into it. This clamp has pivoted upon it two screw-rods, $d\ d'$, each having a washer, $d^2$, and nut $d^3$, the rods being adapted to be turned from the position Figs. 1 and 3, into position Fig. 2, when they enter slots at the ends of the yoke $e$, the latter being provided at its lower side preferably with an annular projection, $e'$, of sufficient length to extend down into the outer coupling, $b$, as far as it is desired to push the upper edge of the inner ring, $f$, of the coupling.

In operation, to apply a coupling the outer ring, $b$, of the coupling will be placed and secured within the clamp or vise A, and the end of the hose $h$ will be inserted into the coupling-ring $b$, and the ring-director $g$, preferably made somewhat conical in shape, and having a handle or other stem, $g'$, by which to move it, will be inserted therein, as in Fig. 2. After this the inner ring, $f$, of the coupling will be passed down from above over the ring-director $g$, the tapering lower end of the inner ring being inserted between the hose $h$ and the director. After this the yoke $e$ is applied. Its downwardly-projecting portion $e'$ is made to rest upon the upper end of the interior ring, $f$, and the bolts $d\ d'$ are turned from the position Fig. 3 into the position Fig. 2, so that by the rotation of the nuts $d^3$ the yoke $e$ will be forced down, causing its projection $e'$, resting on the upper end of the ring $f$, to descend within the open end of the outer ring, $b$, and force the said inner ring, $f$, in advance of it down into the hose $h$, as shown in Fig. 2. This done, the nuts $d^3$ are loosened, the bolts turned away from the yoke, and the yoke is removed from the director $g$. The next step is to insert the working-screw $c$ within the screw-threaded portion of the outer ring, $b$. To do this I employ the holder $i$, having a threaded hub to receive the frictional clamping device or ring $k$ and the screw-threaded upper end of the working-screw. The upper end of this working-screw $c$, when partially screwed into the hub, has the clamping device or ring $k$ forced against it by the screws $l$ sufficiently close to prevent the rotation of the working-screw independently of the holder, while the latter, in the hand of the operator, is being employed to insert the screw-threaded lower end of the working-screw into the outer coupling-ring, $b$. The working-screw having been inserted into the outer portion of the coupling $b$ far enough to meet the upper end of the inner ring, $f$, and make a water-tight joint, the screws $l$ are somewhat withdrawn, relaxing the pressure of the friction-ring $k$ from the upper end of the working-screw, when the holder $i$ may be readily turned and removed from the upper end of the working-screw, leaving the latter secured permanently in position as part of the coupling.

Instead of the exact form of screws $d\ d'$ herein shown, it is obvious that I might employ any other suitable construction of screw or nut, or wedge or handled cam, to cause the movement of the yoke $e$ toward the vise or clamp A.

The inner ring, $f$, having been forced down into position by the projection at the under side of the yoke $e$, and the yoke having been removed, the directing device $g$ will be withdrawn. The union $m$, which is applied to the female part of the coupling, has upon its outer end a flange, $m^2$, which holds in place the internally screw-threaded part of the running or spanner-receiving section $n$ of the coupling, or that part which screws upon the outer end of the working-screw $c$, shown in Fig. 3. To insert this union into the outer ring, $b$, of the female part of the coupling, to hold the running section in place, the holder has to be modified, as shown in Fig. 5, where it will be seen that the hub of the holder is externally screw-threaded, and the screws $l\ l$ are projected down through the said hub, and the friction-ring $k$ is of substantially the same diameter externally as the hub. To apply this union $m$ to an outer ring, $b$, the flanged end of the union will be placed against the clamping device, in turn placed against the end of the hub, and the running section $n$ will be screwed upon the hub of the holder, and then the screws $l$ will be turned to force the clamping device or ring $k$ against it, so as to hold the union firmly and prevent its rotation, except with the holder, and so held the screw-threaded end of the union may be readily screwed into its coupling-ring $b$ until its lower end forms a water-tight joint with the inner ring, $f$. After this the screws $l$ will be loosened, causing the frictional clamping device to release the union, when the running-part $n$ may be unscrewed from the hub of the holder.

The devices described constitute a set of tools required to apply a male and female coupling. The ring-director serves also as a wedge to hold the hose in place between it and the coupling-ring $b$ while the inner ring is being inserted.

I claim—

1. In an apparatus for applying couplings to hose, a suitable clamp for the outer ring of the couplings, and the director to enter the end of the hose, as described, combined with a yoke having a projection to bear upon the inner ring of the coupling, and with means to cause the yoke and vise or clamp to approach each other, whereby the projection of the yoke is enabled to force the inner ring of the coupling longitudinally along over the director, and between it and the interior end of the hose, thus clamping the latter between the inner and outer rings of the coupling, substantially as described.

2. In an apparatus for applying couplings to hose, the clamp to hold the outer ring of the hose, and the holder provided with a screw-threaded hub, combined with a clamping device or ring, and means to regulate its pressure upon the working-screw or union, to enable the holder to turn the working-screw or union into the outer ring of the hose, and by releasing the pressure of the clamping device upon the working-screw or union permit the holder to be readily removed therefrom, substantially as and for the purpose set forth.

In testimony whereof I have signed my name to this specification in the presence of two subscribing witnesses.

CORNELIUS CALLAHAN.

Witnesses:
G. W. GREGORY,
L. F. CONNOR.